United States Patent
Al-Dhahir

(10) Patent No.: US 7,027,536 B1
(45) Date of Patent: Apr. 11, 2006

(54) METHOD AND APPARATUS FOR DESIGNING FINITE-LENGTH MULTI-INPUT MULTI-OUTPUT CHANNEL SHORTENING PRE-FILTERS

(75) Inventor: Naofal Al-Dhahir, Morristown, NJ (US)

(73) Assignee: AT&T Corp., New York, NY (US)

( * ) Notice: Subject to any disclaimer, the term of this patent is extended or adjusted under 35 U.S.C. 154(b) by 893 days.

(21) Appl. No.: 09/668,199

(22) Filed: Sep. 22, 2000

Related U.S. Application Data

(60) Provisional application No. 60/158,714, filed on Oct. 8, 1999, provisional application No. 60/158,713, filed on Oct. 8, 1999.

(51) Int. Cl.
    H04B 7/10    (2006.01)
    H03D 1/00    (2006.01)
    H03H 7/30    (2006.01)

(52) U.S. Cl. .................. 375/347; 375/340; 375/233

(58) Field of Classification Search .............. 375/349, 375/296–347; 348/612; 358/11; 381/94; 342/368
    See application file for complete search history.

(56) References Cited

U.S. PATENT DOCUMENTS

| | | | | |
|---|---|---|---|---|
| 4,561,012 A | * | 12/1985 | Acampora | ................. 348/612 |
| 5,465,396 A | * | 11/1995 | Hunsinger et al. | ............ 455/61 |
| 5,499,272 A | * | 3/1996 | Bottomley | .................. 375/347 |
| 5,539,832 A | * | 7/1996 | Weinstein et al. | ......... 381/94.1 |
| 5,715,282 A | * | 2/1998 | Mansouri et al. | ........... 375/350 |
| 5,717,619 A | * | 2/1998 | Spurbeck et al. | ........... 708/319 |
| 6,127,971 A | * | 10/2000 | Calderbank et al. | ........ 342/368 |
| 6,219,561 B1 | * | 4/2001 | Raleigh | ...................... 455/561 |
| 6,314,147 B1 | * | 11/2001 | Liang et al. | ................ 375/346 |
| 6,470,192 B1 | * | 10/2002 | Karlsson et al. | ............ 455/561 |

FOREIGN PATENT DOCUMENTS

EP           538218 A1 *   4/1993

OTHER PUBLICATIONS

Emmanuel C. Ifeachor, Barrie W. Jervis, Digital Signal Processing A Practical Approach, Addison-Wesley Publishing, 1993.*

* cited by examiner

*Primary Examiner*—Stephen Chin
*Assistant Examiner*—Cicely Ware
(74) *Attorney, Agent, or Firm*—Henry Brendzel

(57) ABSTRACT

A multi-input, multi-output pre-filter improves operation of a multi-input receiver by shortening the effective memory of the channel with a set of FIR filters. The coefficients of these FIR filters can be fashioned to provide a variety of controls by the designer, for example, the value of the effective memory.

7 Claims, 3 Drawing Sheets

METHOD AND APPARATUS FOR DESIGNING FINITE-LENGTH MULTI-INPUT MULTI-OUTPUT CHANNEL SHORTENING PRE-FILTERS

RELATED APPLICATION

This application claims priority from Provisional application No. 60/158,713 filed on Oct. 8, 1999. This application is also related to a Provisional application No. 60/158,714, also filed on Oct. 8, 1999.

BACKGROUND OF THE INVENTION

The combination of maximum likelihood sequence estimation (MLSE) with receiver diversity is an effective technique for achieving high performance over noisy, frequency-selective, fading channels impaired by co-channel interference. With the addition of transmitter diversity, the resulting multi-input multi-output (MIMO) frequency-selective channel has a significantly higher capacity than its single-input multi-output (SIMO) or single-input single-output (SISO) counterparts. The use of maximum likelihood multi-user detection techniques on these frequency-selective MIMO channels significantly outperforms single-user detection techniques that treat signals from other users as colored noise. However, MLSE complexity increases exponentially with the number of inputs (or transmit antennas) and with the memory of the MIMO channel, making its implementation over sever inter-symbol interference (ISI) channels very costly.

The MIMO channel can be modeled as a collection of FIR filters (i.e., an FIR filter between each input point (e.g., transmitting antenna) and each receiving point (e.g. receiving antenna), and the "memory of the channel" corresponds to the number of taps in the FIR filters.

The Discrete Matrix Multitone (DMMT) was shown to be a practical transceiver structure that asymptotically achieves the MIMO channel capacity when combined with powerful codes. It uses the Discrete Fourier Transform (DFT) to partition the frequency responses of the underlying frequency-selective channels of the MIMO systems into a large number of parallel, independent, and (approximately) memoryless frequency subchannels. To eliminate inter-block and intra-block interference, a cyclic prefix whose length is equal to the MIMO channel memory is inserted in every block. On severe-ISI MIMO channels, the cyclic prefix overhead reduces the achievable DMMT throughput significantly, unless a large FFT size is used which, in turn, increases the computational complexity, processing delay, and memory requirements in the receiver.

In short, the computation complexity increases exponentially with the number of taps in the FIR filters that may be used to model the channel.

N. Al-Dhahir and J. M. Cioffi, in "Efficiently-Computed Reduced-Parameter Input-Aided MMSE Equalizers for ML Detection: A Unified Approach," IEEE Trans. Information Theory, pp. 903–915, May 1996, disclose use of a time-domain pre-filter in the receiver to shorten the effective channel memory and hence reduce the cyclic prefix overhead and/or the number of MLSE states. The disclosed approach, however, is for SISO systems, and not for MIMO systems.

SUMMARY

An advance in the art is realized with a MIMO pre-filter that is constructed from FIR filters with coefficients that are computed based on environment parameters that are designer-chosen. Given a transmission channel that is modeled as a set of FIR filters with memory v, a matrix W is computed for a pre-filter that results in an effective transmission channel B with memory $N_b$, where $N_b<v$, where B is optimized so that $B_{opt}=\text{argmin}_B \text{trace}(R_{ee})$ subject to selected constraints; $R_{ee}$ being the error autocorrelation function. The coefficients of W, which are sensitive to a variety of designer constraints, are computed by a processor within pre-filter at the front end of a receiver and loaded into an array of FIR filters that form the pre-filter.

DETAILED DESCRIPTION

Figure 1:
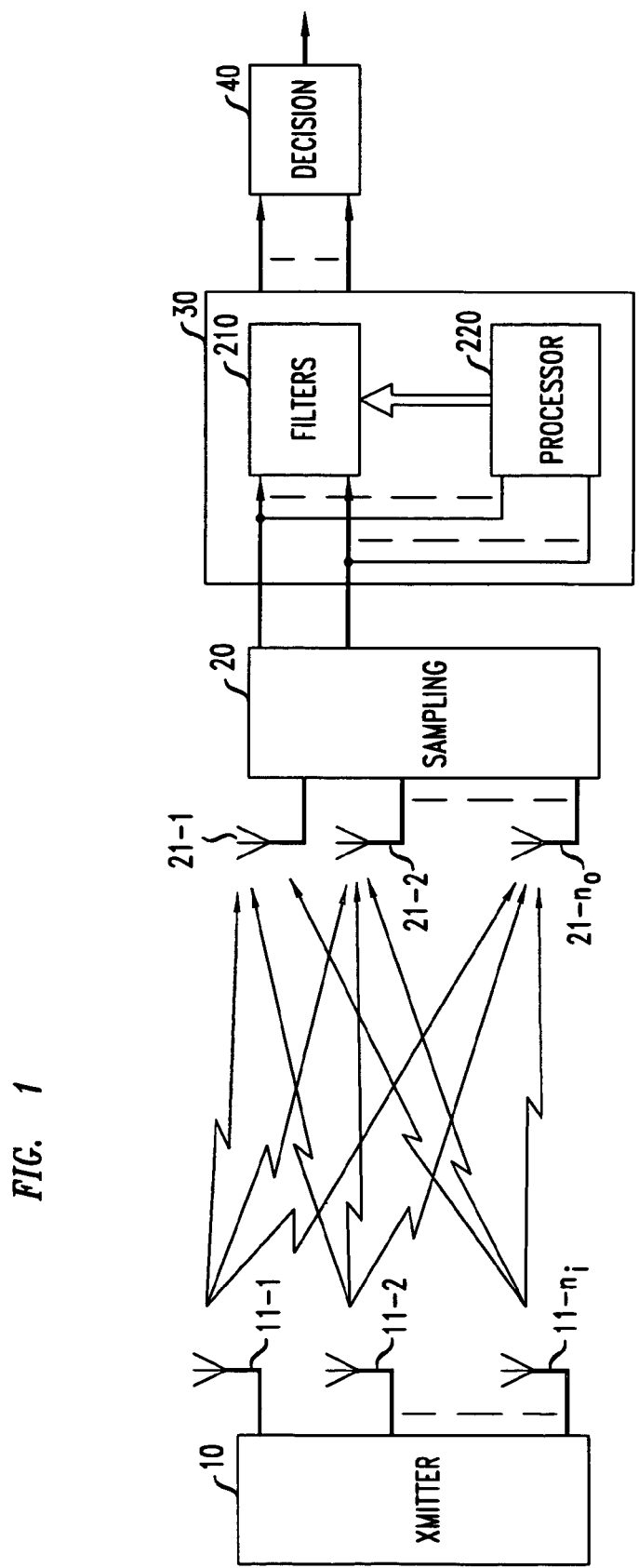
FIG. 1 shows the major elements of a receiver in accord with the principles disclosed herein.

FIG. 1 depicts the general case of an arrangement with $n_q$ transmitting antennas 11-1, 11-2, . . . 11-$n_q$, that output signals (e.g., space-time encoded signals) to a transmission channel, and no receiving antennas 21-1, 21-2, . . . 21-$n_o$. Each transmitting antenna p outputs a complex-valued signal $x_p$, the signals of the $n_q$ antennas pass through a noisy transmission channel, and the $n_o$ receiving antennas capture the signals that passed through the transmission channel. The received signals are oversampled by a factor of I in element 20 and applied to pre-filter 30. Thus, the sampling clock at the output of element 20 is of period $T_s=T/I$, where T is the inter-symbol period at the transmitting antennas. The transmission channel's characterization is also referenced to $T_s$. In the illustrative embodiment disclosed herein, therefore, pre-filter 20 develops $n_i$ output signals that are applied to a conventional multi-input receiver 40, and the received signal can be expressed by $$y_k^{(j)} = \sum_{i=1}^{N} \sum_{m=0}^{v^{(i,j)}} h_m^{(i,j)} x_{k-m}^{(i)} + n_k^{(j)}, \quad (1)$$

where $y_k^{(j)}$ is the signal at time k at the $j^{th}$ receiving antenna, $h_m^{(i,j)}$ is the $m^{th}$ coefficient (tap) in the channel impulse response between the $i^{th}$ transmitting antenna and the $j^{th}$ receiving antenna, and $n^{(j)}$ is the noise vector at the $j^{th}$ receiving antenna. The memory of this path (i.e., the largest value of m for which $h_m^{(i,j)}$ is not zero) is denoted by $v^{(i,j)}$. It is not unreasonable to assume, however, that the memory of the transmission channel is the same for all i,j links ($n_i \times n_o$ such links), in which case $v^{(i,j)}=v$. Alternatively, the $v^{(i,j)}$ limit in equation (1) can be set to that v which corresponds to maximum length of all of the $n_i \times n_o$ channel input responses, i.e., $v=\max_{i,j} v^{(i,j)}$. All of these variables in equation (1) are actually I×1 column vectors, corresponding to the/time samples per symbol in the oversampled FIG. 1 arrangement. By grouping the received samples from all $n_o$ antennas at symbol time k into an $n_o I \times 1$ column vector $y_k$, one can relate $Y_k$ to the corresponding $n_i \times 1$ (column) vector of input samples as follows $$y_k = \sum_{m=0}^{v} H_m x_{k-m} + n_k, \qquad (2)$$

where $H_m$ is the MIMO channel coefficients matrix of size $n_o \times n_j$, $x_{k-m}$ is a size $n_i \times 1$ input (column) vector, and $n_k$ is a size $n_o \times 1$ vector.

Over a block of $N_f$ symbol periods, equation (2) can be expressed in matrix notation as follows:

$$\begin{bmatrix} y_{k+N_f-1} \\ y_{k+N_f-2} \\ \vdots \\ y_k \end{bmatrix} = \begin{bmatrix} H_0 & H_1 & \ldots & H_v & 0 & \ldots & 0 \\ 0 & H_0 & H_1 & \ldots & H_v & 0 & \ldots \\ \vdots & \vdots & \vdots & \vdots & \vdots & \ddots & \vdots \\ 0 & \ldots & 0 & H_0 & H_1 & \ldots & H_v \end{bmatrix} \begin{bmatrix} x_{k+N_f-1} \\ x_{k+N_f-2} \\ \vdots \\ x_{k-v} \end{bmatrix} + \begin{bmatrix} n_{k+N_f-1} \\ n_{k+N_f-2} \\ \vdots \\ n_k \end{bmatrix} \qquad (3)$$

or, more compactly, $$y_{k+N_f-1:k} = H x_{k+N_f-1:k-v} + n_{k+N_f-1:k}. \qquad (4)$$

The subscripts in equation (4) indicate a range. For example $k+N_f-1:k$ indicates the range $k+N_f-1$ and $k$, inclusive.

It is useful to define the following correlation matrices:

$$R_{xy} \equiv E[X_{k+N_f-1:k-v} Y^*_{k+N_f-1:k}] = R_{xx} H^* \qquad (5)$$

$$R_{yy} \equiv E[Y_{k+N_f-1:k} Y^*_{k+N_f-1:k}] = H R_{xx} H^* + R_{nn}, \qquad (6)$$

$$R_{xx} \equiv E[X_{k+N_f-1:k-v} X^*_{k+N_f-1:k-v}] \text{ and} \qquad (7)$$

$$R_{nn} \equiv E[n_{k+N_f-1:k} N^*_{k+N_f-1:k}] \qquad (8)$$

It is assumed that these correlation matrices do not change significantly in time or, at least, do not change significantly over a time interval that corresponds to a TDMA burst (assumed to be much shorter than the channel coherence time), which is much longer than the length of the pre-filter, in symbol periods denoted by $N_f$. Accordingly, a re-computation of the above matrices, and the other parameters disclosed herein, leading to the computation of pre-filter coefficients, need not take place more often than once every TDMA burst.

Once H, $R_{xx}$ and $R_{nn}$ are known, $R_{xy}$ and $R_{yy}$ are computed by $R_{xx}H^*$ and $HR_{xx}H^* + R_{nn}$, respectively.

Given the MIMO channel matrix H with $v+1$ members ($H_0, H_1, \ldots H_v$), the objective is to create a MIMO pre-filter W (element 30 in FIG. 1) with $N_f$ matrix taps, i.e., matrix $W \equiv [W_0 \ W_1 \ \ldots \ W_{N_f-1}]^T$, that equalizes H so as to create an overall transmission channel for receiver 40 that corresponds to a matrix B with memory $N_b$, where $N_b \ll v$.

The matrix B can be expressed as $B \equiv [B_0 \ B_1 \ \ldots \ B_{N_b}]^T$ where each $B_i$ is of size $n_i \times n_i$.

The MIMO channel-shortening pre-filter W (element 30) is conditioned, or adjusted, to minimize the equalization Mean Squared Error (MSE), defined by $MSE \equiv trace(R_{ee})$, where $R_{ee}$ is the autocorrelation matrix of the error vector $E_k$ that is given by $$E_k = \tilde{B}^* x_{k+N_f-1:k-v} - W^* Y_{k+N_f-1:k}, \qquad (9)$$

where the augmented MIMO matrix, $\tilde{B}^*$, is $$\tilde{B} \equiv [0_{n_i \times n_i \Delta} B^*_0 B^*_1 \ldots B^*_{N_b} 0_{n_i \times n_i \Delta} B^* 0_{n_i \times n_i s}] \qquad (10)$$

$\Delta$ is the decision delay that lies in the range $0 \leq (N_f + v - N_b - 1)$, and $s \equiv N_f + v - N_b - \Delta - 1$. The $n_i \times n_i$ error autocorrelation function $R_{ee}$ can be expressed by the following:

$$R_{ee} \equiv E[E_k E_k^*] \qquad (11)$$

$$= \tilde{B}^*(R_{xx} - R_{xy} R_{yy}^{-1} R_{yx}) \tilde{B}$$

$$= \tilde{B}^* R^\perp \tilde{B}$$

$$= \tilde{B}^* \bar{R} B,$$

where $\bar{R}$ is a sub-matrix of $R^\perp$ determined by $\Delta$.

Using the orthogonality principle, which states that $E[E_k y^*_{k+N_f-1:k}] = 0$ it can be shown that the optimum channel-shortening pre-filter and target impulse response filters (W and B, respectively) are related by $$W^*_{opt} = \tilde{B}^*_{opt} R_{xy} R_{yy}^{-1} \qquad (12)$$

$$= \tilde{B}^*_{opt} R_{xx} H^* (H R_{xx} H^* + R_{nn})^{-1}$$

$$= \tilde{B}^*_{opt} (R_{xx}^{-1} + H^* R_{nn}^{-1} H)^{-1} H^* R_{nn}^{-1}.$$

The last line shows explicitly that the MIMO channel-shortening pre-filter consists of a noise whitener $R_{nn}^{-1}$, a MIMO matched filter $H^*$, and a bank of FIR channel-shortening pre-filter elements.

It remains to optimize $\tilde{B}$ such that the MSE is minimized, which may be obtained by computing the parameters of B that, responsive to specified conditions, minimizes the trace (or determinant) of $R_{ee}$. The following discloses two approaches to such optimization.

Under one optimization approach the coefficients of B are constrained so that some coefficient of B is equal to the identity matrix, I. A solution, subject to this Identity Tap Constraint (ITC), can be expressed by $$B_{opt}^{ITC} = \operatorname{argmin}_B \operatorname{trace}(R_{ee}) \text{ subject to } B^* \phi = I_{n_i}, \qquad (13)$$

where $\phi^* \equiv [0_{n_i \times n_i m} \ I_{n_i} \ 0_{n_i \times n_i (N_b - m)}]$ and $0 \leq m \leq N_b$. It can be shown that the optimum MIMO target impulse response and the corresponding error autocorrelation matrix are given by $$B_{opt}^{ITC} = \bar{R}^{-1} \phi (\phi^* \bar{R}^{-1} \phi)^{-1} \text{ and} \qquad (14)$$

$$R_{ee,min}^{ITC} = (\phi^* \bar{R}^{-1} \phi)^{-1} \text{ and} \qquad (15)$$

As indicated above, $\bar{R}$ is affected by the delay parameter $\Delta$. Unless dictated by the designer, the delay parameter $\Delta$, which can range between 0 and $(N_f + v - N_b - 1)$, is chosen to minimize the trace of $R_{ee,min}^{ITC}$. Similarly, the index parameter m, which ranges between 0 and $N_b$, and which affects $\phi$, is chosen to minimize the trace of $R_{ee,min}^{ITC}$.

Under a second optimization approach the imposed constraint is $B^* B = I_{n_i}$. A solution subject to this Ortho-Normality Constraint (ONC) can be expressed by $$B_{opt}^{ONC} = \operatorname{argmin}_B \operatorname{trace}(R_{ee}) \text{ subject to } B^* B = I_{n_i}, \qquad (16)$$

Defining the eigen-decomposition $$\bar{R} = U \Sigma U^* = U \operatorname{diag}(\sigma_0, \sigma_1 \ldots \sigma_{n_i(N_b+1)-1}) U^*, \qquad (17)$$

where $\sigma_0 \leq \sigma_1 \ldots \leq \sigma_{n_i(N_b+1)-1}$, then the optimum MIMO target response and the resulting error autocorrelation matrix are given by $$B_{opt}^{ONC} = U[e_{n_iN_b} \ldots e_{n_i(N_b+1)-1}] \quad (18)$$

where $e_i$ is unit vector with a 1 at position i, and 0's elsewhere, and $$R_{ee,min}^{ONC} = \text{diag}(\sigma_{n_iN_b}, \ldots \sigma_{n_i(N_b+1)-1}) \quad (19)$$

Illustratively, if $n_i=3$ and $N_b=3$, $B_{opt}^{ONC}=U[e_9,e_{10},e_{11}]$, meaning that $B_{opt}^{ONC}$ is a three column matrix comprising the $9^{th}$ through the $11^{th}$ columns of matrix U. Stated in words, the optimum MIMO target impulse response matrix is given by the $n_i$ eigenvectors of $\bar{R}$ that correspond to its $n_i$ smallest eigenvalues. The delay parameter $\Delta(0 \leq \Delta \leq N_f + v - N_b - 1)$ that affects R is optimized to minimize the trace (or determinant) of $R_{ee,min}^{ONC}$ With the above analysis in mind, a design of a prefilter 30 can proceed for any given set of system parameters, which includes:

MIMO channel memory between the input points and the output point of the actual transmission channel, v, The number of pre-filter taps chosen, $N_f$, The shortened MIMO memory, $N_b$, The number of inputs to the transmission channel, $n_i$, The number of output derived from the transmission channel, $n_o$, The autocorrelation matrix of the inputs, $R_{xx}$, The autocorrelation matrix of the noise, $R_{nn}$, The oversampling used, I, and The decision delay, $\Delta$.

The structure of pre-filter 30 is shown In FIG. 1, which comprises two main components: processor 220 and filter section 210.

Figure 2:
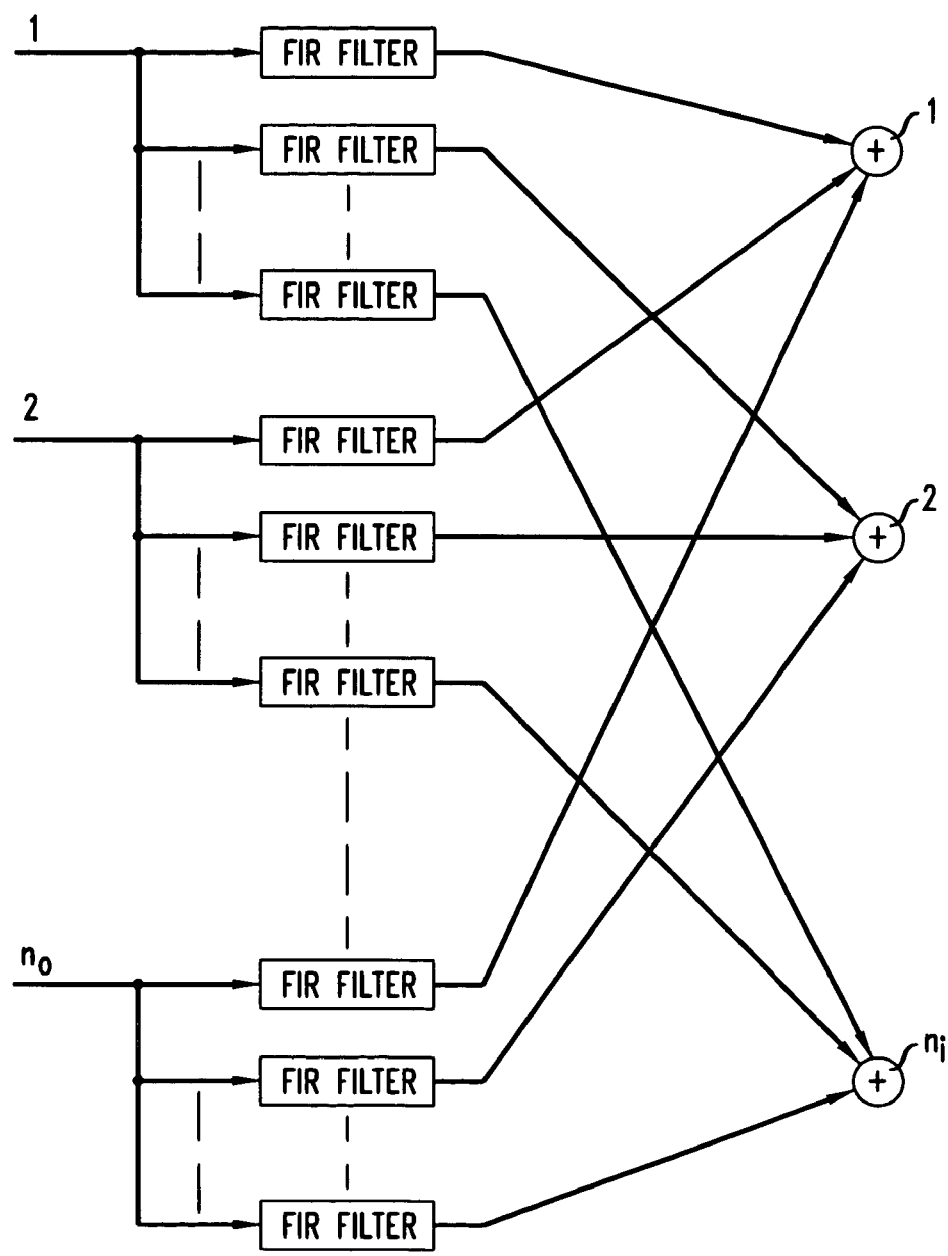
FIG. 2 presents the structure of pre-filter 30.

Filter section 210, shown in FIG. 2, comprises a collection of FIR filters that connect the no input array of signals from sampling circuit 20 to an $n_i$ output array of points. That is, there are $j \times i$ FIR filters $P_{j,i}$, that couple input point j to output point i.

Processor 220 is responsive to the no signals received by antennas 21 and sampled by circuit 20, and it computes the coefficients of W, as disclosed above. $W_0$ is a matrix that defines the coefficients in the $0^{th}$ tap of the $j \times i$ FIR filters, $W_1$ is a matrix that defines the coefficients in the $1^{st}$ tap of the $j \times i$ FIR filters, etc.

Figure 3:
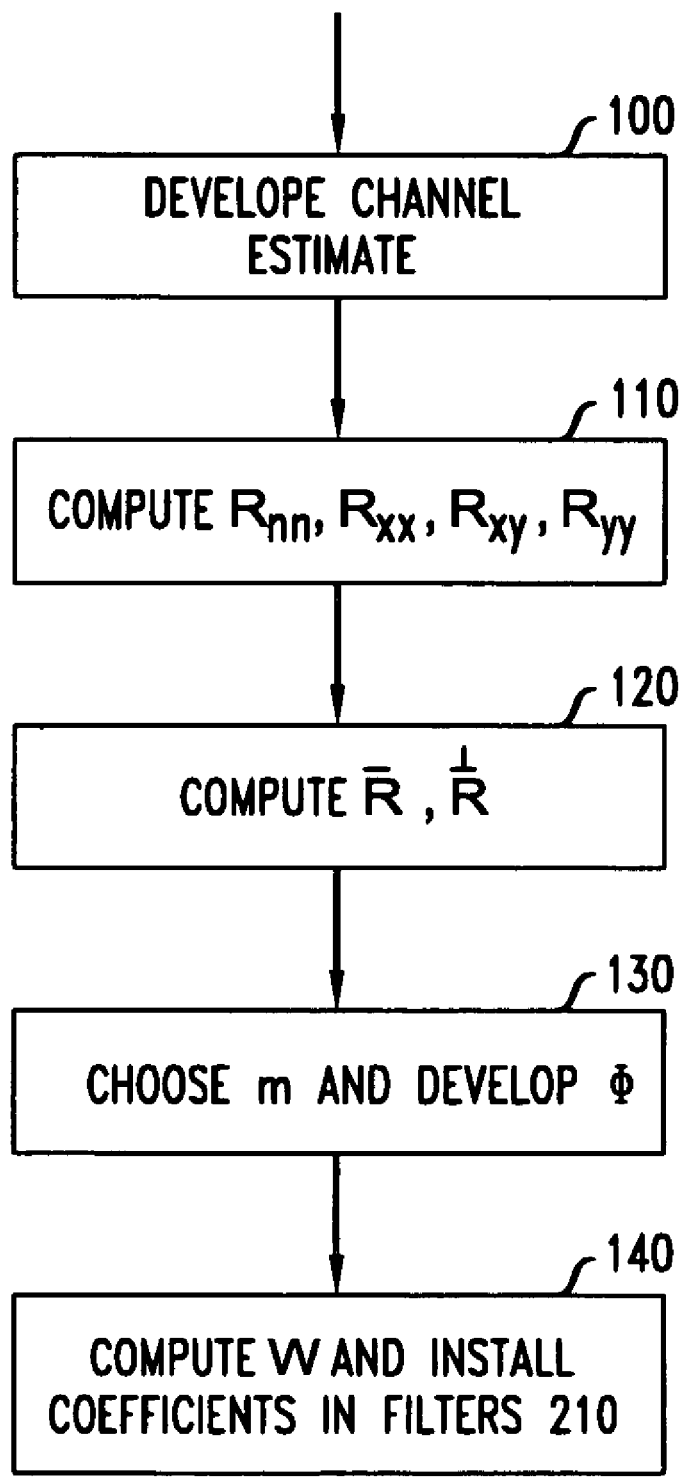
FIG. 3 is a flowchart describing the method carried out by processor 220 within pre-filter 30.

The method of developing the parameters of pre-filter 30, carried out in processor 220, is shown in FIG. 3. Block 100 develops an estimate of the MIMO channel between the input points and the output point of the actual transmission channel. This is accomplished in a conventional manner through the use of training sequences. The estimate of the MIMO channel can be chosen to be limited to a given memory length, v, or can be allowed to include as much memory as necessary to reach a selected estimate error level. That, in turn, depends on the environment and is basically equal to the delay spread divided by $T_s$.

Following step 100, step 110 determines the matrices, $R_{nn}$, $R_{xx}$, $R_{xy}$, and $R_{yy}$. The matrix $R_{nn}$ is computed by first computing $n=y-Hx$ and then computing the expected value $E[n*n]$—see equation (8) above. The matrix $R_{xx}$ is computed from the known training sequences—see equation (7) above—(or is pre-computed and installed in processor 220). It may be noted that for uncorrelated inputs, $R_{xx}=I$. The matrices $R_{xy}$ and $R_{yy}$ are computed from the known training sequences and the received signal or directly from H and $R_{nn}$—see equations (5) and (6) above.

Following step 110, step 120 computes $R^\perp = R_{xx} - R_{xy}R_{yy}^{-1}R_{yx}$, and the sub-matrix $\bar{R}$. From equation (10) it can be seen that $\bar{R}$ is obtained by dropping the first $n_i\Delta$ rows and the last $n_i s$ rows of $R^\perp$.

In accordance with the ITC approach, selecting some value of $0<m<N_b$ allows completion of the design process. Accordingly, following step 120, step 130 chooses a value for m, develops $\phi^* \equiv [0_{n_i \times n_i m} I_{n_i} 0_{n_i \times n_i(N_b-m)}]$ and carries out the computation of equation (13). Step 140 finally develops the coefficients of matrix W in accordance with equation (12), and installs the developed coefficients within filter 210.

In accordance with the ONC approach, step 130 computes the matrix U in a conventional manner, identifies the unit vectors $e_i$, and thus obtains the matrix B. As with the ITC approach, step 140 develops the coefficients of matrix W in accordance with equation (12), and installs the developed coefficients within filter 210.

It should be understood that a number of aspects of the above disclosure, for example, those related to the ITC constraint and to the ONC constraint, are merely illustrative, and that persons skilled in the art may make various modifications that, nevertheless, are within the spirit and scope of this invention.

For example, the pre-filter described above generates a multi-output signal, with the number of outputs being $n_i$, that being also the number of transmitting antennas 11. This, however, is not a limitation of the principles disclosed herein. The number of pre-filter outputs can, for example, be larger than $n_i$, for example as high as $n_i(N_b+1)$. The performance of the receiver will be better with more filter outputs, but more outputs require more FIR filters, more FIR filter coefficients, and correspondingly, a greater processing power requirement placed on processor 220.

What is claimed is:

1. A receiver operating in an environment where a transmission channel, H, between a transmitter of information and said receiver has a memory corresponding to n transmitted symbols, said receiver being responsive to an $n_o$ plurality of receiving antennas comprising:

a pre-filter having an $n_o \times n_i$ plurality of FIR filters, F(j,k), where $n_i$ is a number of transmitting antennas whose signals said receiver is processing, j is an index running from 1 to $n_o$ and k is an index running from 1 to $n_i$, each filter F(j,k) being responsive to a signal that is derived from receiving antenna j, and applying its output signal to a pre-filter output point k;

decision logic responsive to said pre-filter output points; and a sampling circuit interposed between said $n_o$ plurality of antennas and said pre-filter that samples received signal at rate $$T_s = \frac{T}{l},$$

where l is an integer that is greater than 1, and T is symbol rate of a transmitter whose signals said receiver receives, where said plurality of FIR filters is expressed by matrix W, and W is computed by $W_{opt}^* = \tilde{B}_{opt}^* R_{xy} R_{yy}^{-1}$, $W_{opt}^* = \bar{B}_{opt}^* R_{xx} H^* (HR_{xx} H^* + R_{nn})^{-1}$, or $W_{opt}^* = \bar{B}_{opt}^* (R_{xx}^{-1} + H^* R_{mm}^{-1} H)^{-1} H^* R_{nn}^{-1}$, where $R_{xx}$ is an autocorrelation matrix of a block of signals transmitted by a plurality of transmitting antennas to said $n_0$ antennas via a channel having a transfer characteristic H, $W_{opt}$ is the optimum channel-shortening pre-filter, $R_{nn}$ is an autocorrelation matrix of noise received by said plurality of $n_o$ antennas during said block of signals transmitted by said transmitting antennas, $R_{xy}=R_{xx}H^*$, $R_{yy}=HR_{xx}^*+R_{nn}$, are correlation matrices and $B_{opt}^*$, is a sub-matrix of matrix $B_{opt}^*$, where $B_{opt}=\mathrm{argmin}_{\tilde{B}}\mathrm{trace}(R_{ee})$ subject to a selected constraint, $R_{ee}$ being the error autocorrelation function.

2. The receiver of claim 1 wherein said plurality of FIR filters are subjected to designer constraints relative to any one or a number of members of the following set: transmission channel memory, size of said block, effective memory of the combination consisting of said transmission channel and said pre-filter; $n_i$, $n_o$, autocorrelation matrix $R_{xx}$, autocorrelation matrix $R_{nn}$, value of factor 1 in said sampling circuit, and decision delay.

3. The receiver of claim 1, where said matrix W is expressible by $W \equiv [W_0 W_1 \ldots W_{N_f-1}]^1$, where matrix $W_q$, q being an index between 0 and $N_{f-1}$, is a matrix that specifies $q^{th}$ tap coefficients of said FIR filters.

4. The receiver of claim 1 where said constraint restricts B so that $B^*\Phi = I_{n_i}$, where $\Phi^* \equiv [0_{n_i \times n_i m} \; I_{n_i} \; 0_{n_i \times n_i(N_b-m)}]$ and m is a selected constant.

5. The receiver of claim 4 where $B = \bar{R}^{-1}\Phi(\Phi^*\bar{R}$ is a sub-matrix of a matrix $R^\perp = R_{xx} - R_{xy}R_{yy}^{-1}R_{yx}$.

6. The receiver of claim 1 where said constraint restrict B so that $B^*B = I_{n_i}$.

7. The receiver of claim 6 where $B = U[e_{n_i N_b} \ldots e_{n_i(N_b+1)-1,}]$, each element $e_p$ is a vector having a 0 element in all rows other than row p, at which row the element is 1, and U is a matrix that satisfies the equation $\bar{R} = U\Sigma U^*$, $\Sigma$ being a diagonal matrix.

* * * * *